Dec. 17, 1940. W. L. McNAMARA 2,224,975
VESSEL TRANSFERRING MECHANISM
Filed Oct. 19, 1937   7 Sheets-Sheet 5
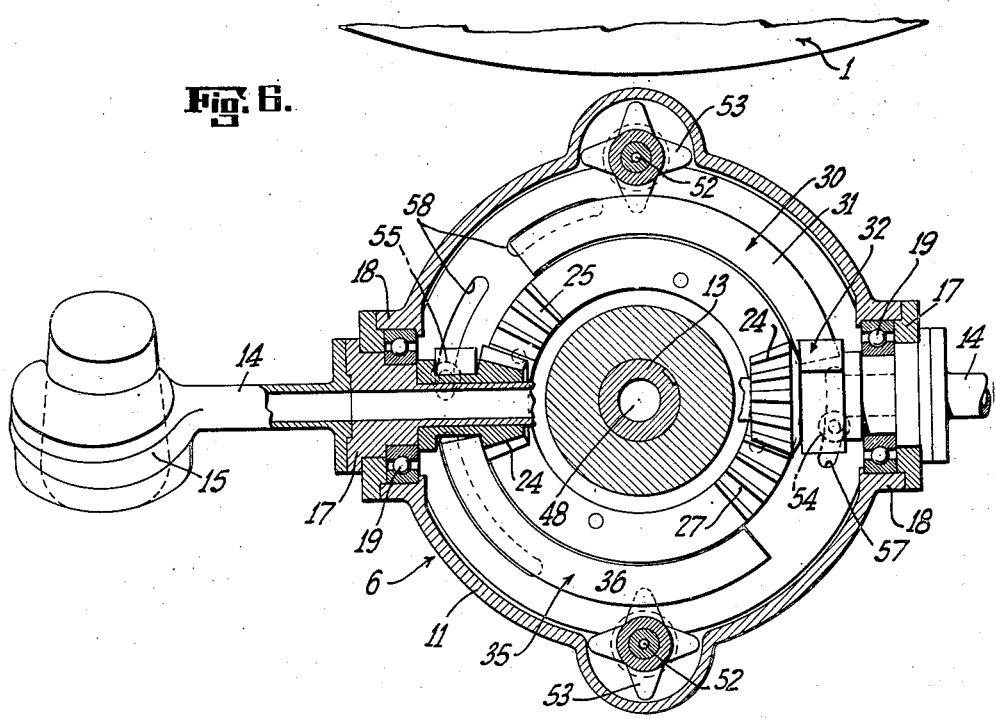
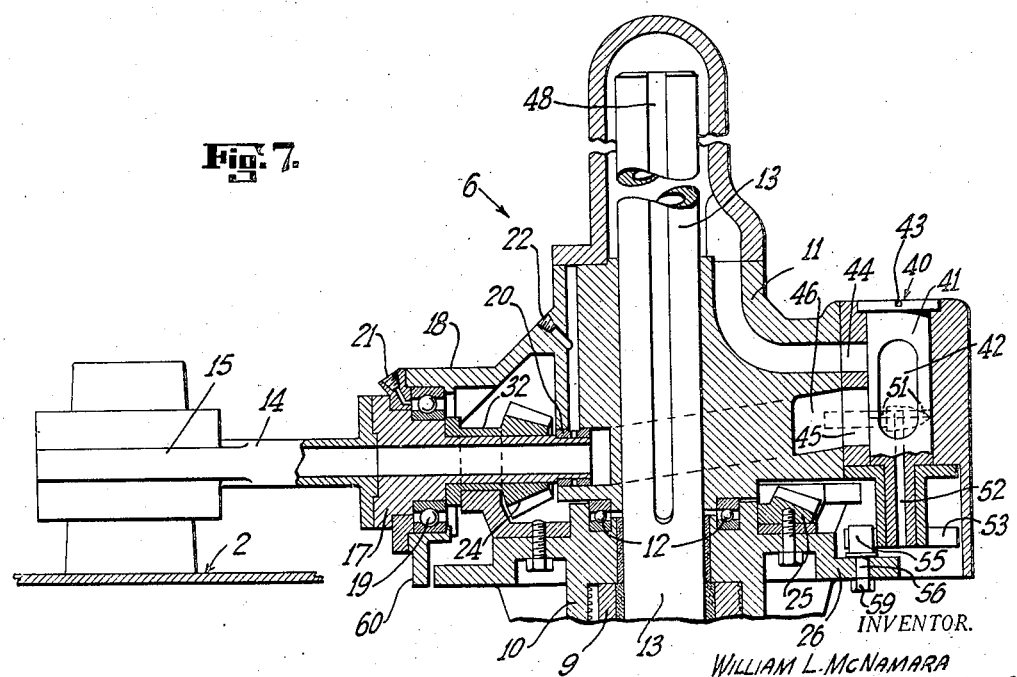
INVENTOR.
WILLIAM L. McNAMARA
BY
ATTORNEY

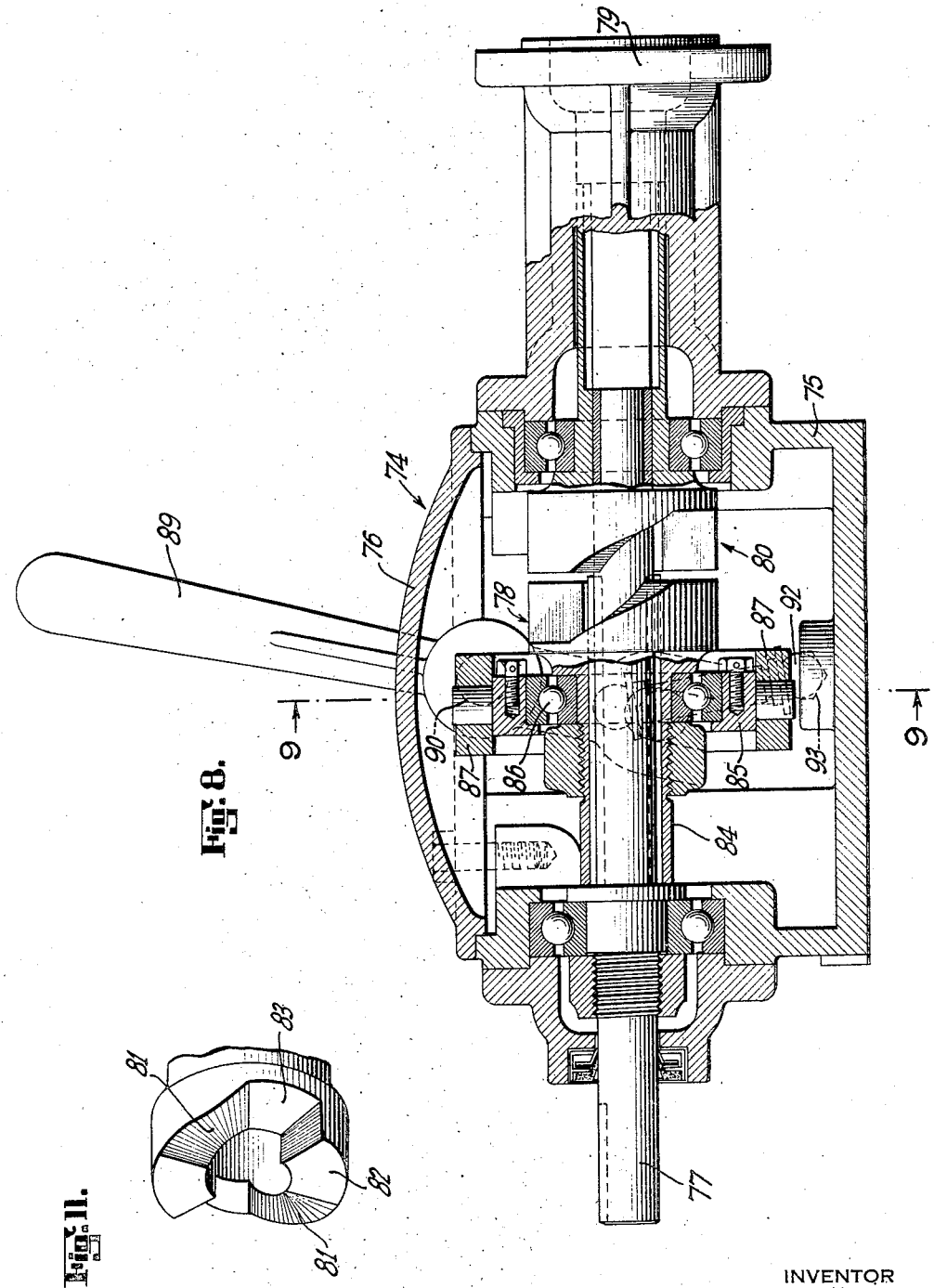

Dec. 17, 1940.  W. L. McNAMARA  2,224,975
VESSEL TRANSFERRING MECHANISM
Filed Oct. 19, 1937.  7 Sheets-Sheet 7

INVENTOR
WILLIAM L. McNAMARA
BY Norman H. Holland
ATTORNEY

Patented Dec. 17, 1940

2,224,975

UNITED STATES PATENT OFFICE 2,224,975

VESSEL TRANSFERRING MECHANISM

William L. McNamara, Connellsville, Pa., assignor to Capstan Glass Company, Connellsville, Pa., a corporation of Delaware Application October 19, 1937, Serial No. 169,775

11 Claims. (Cl. 214—1)

The present invention relates to transferring mechanisms and more particularly to a transferring device for glass containers and the like.

In the manufacture of glassware such as bottles, jars, tumblers and the like, it is customary to drop charges of molten glass into molds carried on a rotatable table which is ordinarily operated intermittently. The charges of glass are pressed, blown, or pressed and blown in the molds and delivered at what is commonly called the take-off station, where the glass container is raised from the molds or the molds are opened to expose the container. The ware is then removed either manually or by mechanical means. Various types of mechanical means have been devised, many of which grip the necks or upper ends of the jars to transfer them, while others grip the sides of the jars or tumblers. Such devices tend to deform the ware, particularly if it is relatively soft at the take-off station, in addition, their operation is complicated by the gripping and releasing devices.

In my previous patents, No. 1,947,609 and No. 1,947,610, there is illustrated a transferring mechanism in which the containers are held on the transfer arm by vacuum. Such devices have been found to be a striking improvement over other types of take-out devices, particularly when utilized with tumblers and similar smooth-sided containers. The present transfer device is also of the vacuum type, as distinguished from mechanical grippers and the like, and is an improvement upon the structures of the above patents. The improvements lie in various features of construction and in the attaining of greater speed, smoother operation, and less likelihood of breakage of containers. In addition, the present invention is designed to prevent accidental injury to employees and to machinery coming in contact with the transfer device.

An object of the present invention is to provide a transferring device adapted to be operated at substantially greater rates of speed than devices heretofore used without impairing the smooth operation of the device and without subjecting the containers to greater strains in handling.

Another object of the invention is to provide an improved transfer device for glass containers in which the smooth uniform movement thereof minimizes breakage of containers and wear on the device.

Another object of the invention is to provide a transferring device which may be mounted on a fabricating machine and which is adapted to be synchronized with the mold table of the fabricating machine and, at the same time, is adapted to be stopped and started without disturbing the relation of the container engaging arms to the take-off station.

Another object of the invention is to provide improved means for retaining the container engaging means accurately in position to engage the containers to assure adherence of the container to the engaging means and likewise to retain the engaging means in accurate position during release of the containers to prevent their toppling over.

Another object of the invention is to provide means for adapting the device to transfer containers of various heights.

Another object of the invention is to provide a transfer device affording greater safety to workmen and to persons moving about the glass machine.

A further object of the invention is to provide an improved clutch for operating a transfer device.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a top plan view of a transferring machine illustrating a preferred embodiment of the invention;

Fig. 6 is a sectional view illustrating an arm being rotated to invert the ware;

Fig. 7 is a staggered sectional view taken along the line 7—7 of Fig 3;

Fig. 8 is a sectional view taken along the line

Figure 1:
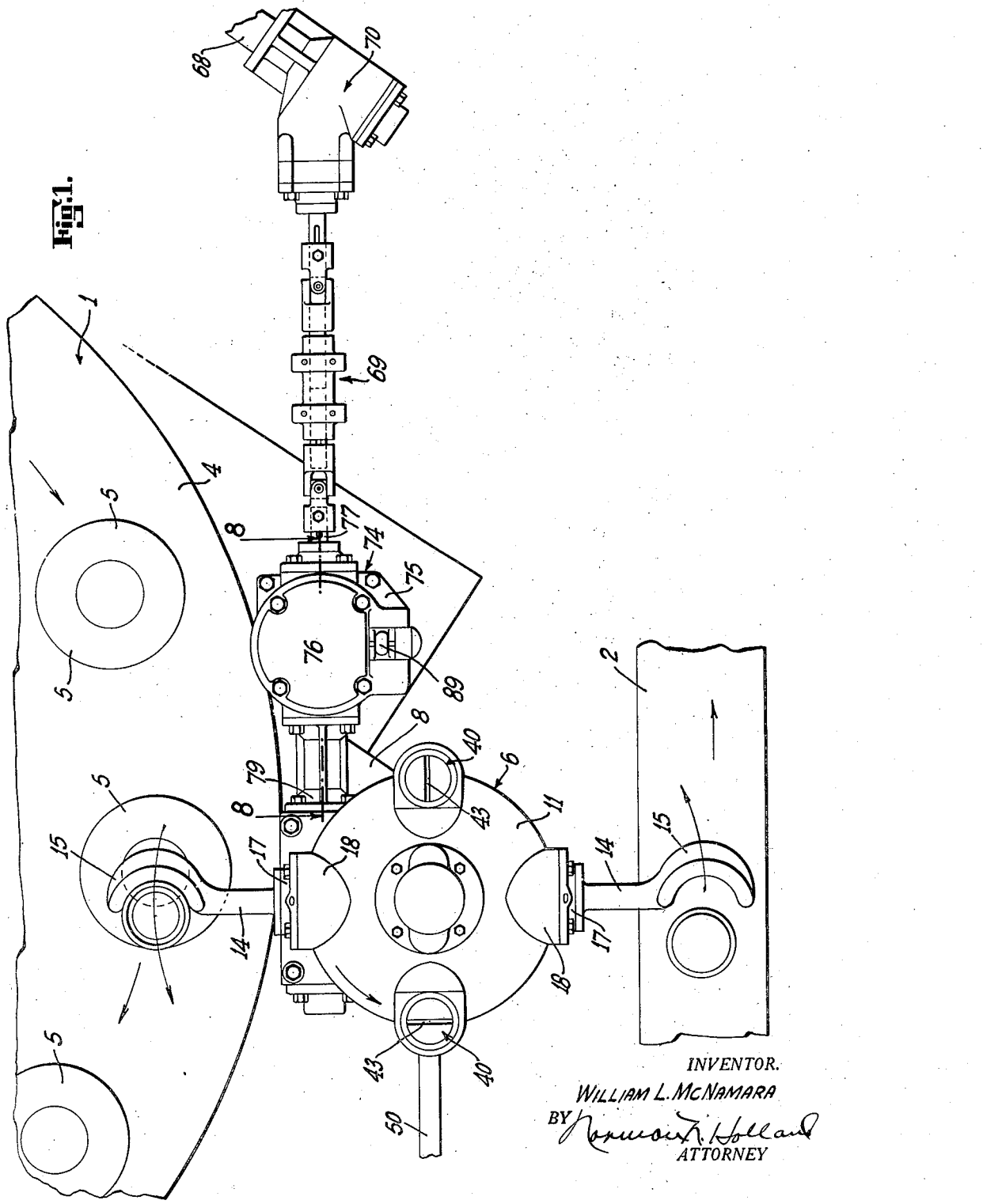
Figure 10:
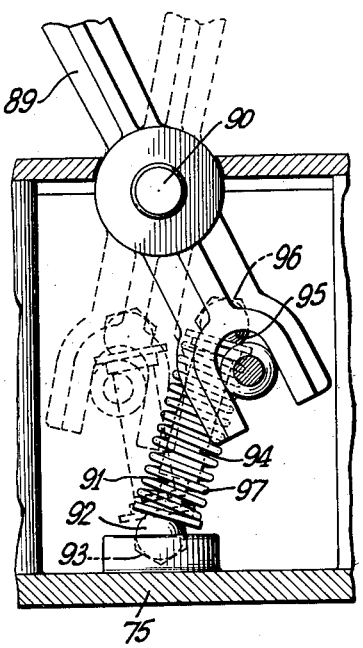
Figure 9:
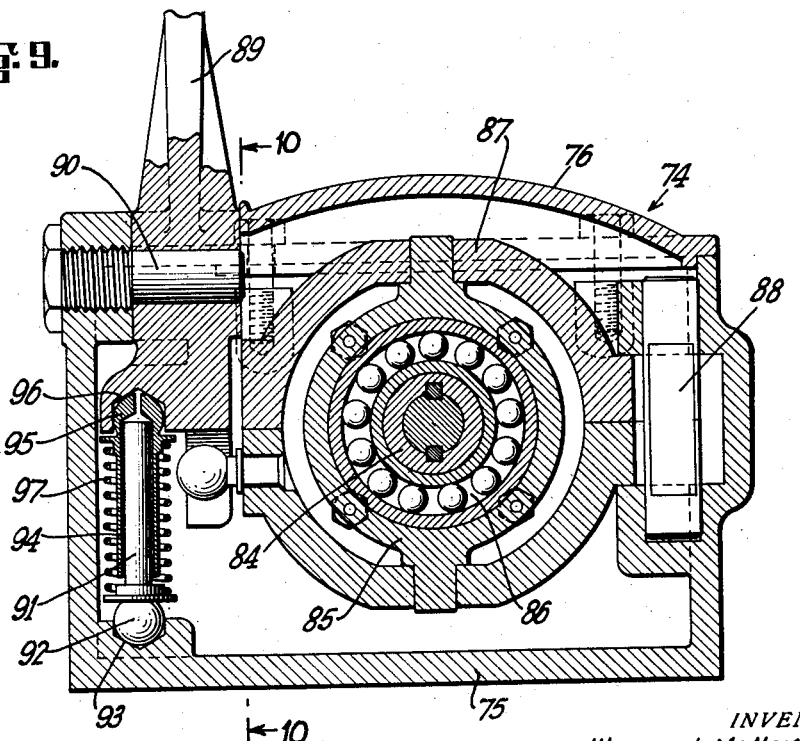

8—8 of Fig. 1 illustrating a preferred form of a clutch for the device;

Fig. 9 is a sectional view taken along the line 9—9 of Fig. 8;

Fig. 10 is a sectional view taken along the line 10—10 of Fig. 9 illustrating the operation of the clutch lever; and Fig. 11 is a perspective view illustrating one of the clutch faces in detail.

Figure 2:
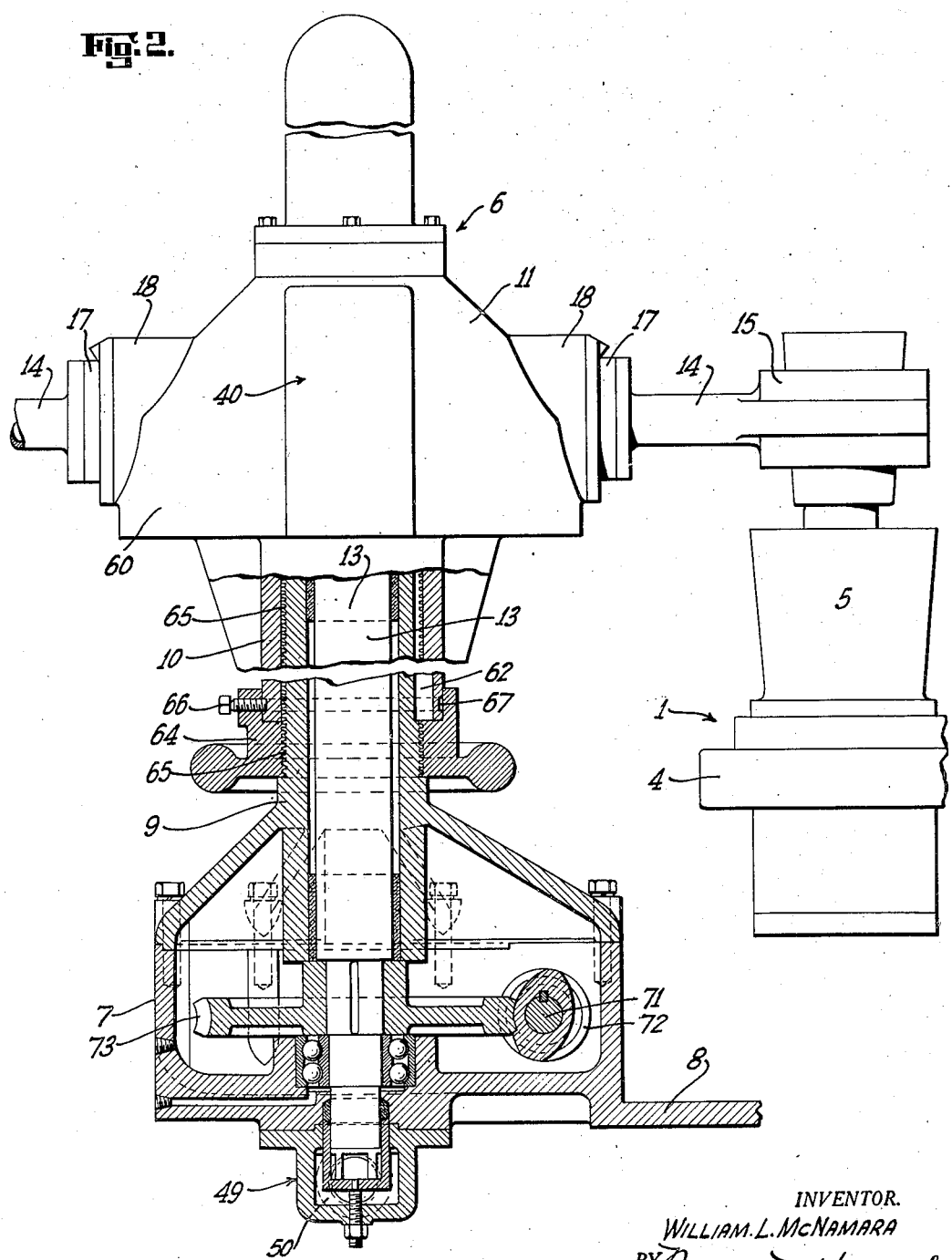
Fig. 2 is a side elevational view, partly in section, of the machine shown in Fig. 1.

Referring to the drawings and more particularly to Figs. 1 and 2, a preferred embodiment of the invention is illustrated in which articles of glassware are transferred from a fabricating machine 1, partially shown, to a conveyor 2 or other receiving station. The fabricating machine comprises a mold table 4 adapted to be intermittently rotated by a suitable drive, not shown, and a series of molds 5 on the mold table wherein the ware is formed either by pressing or blowing devices. When the finished ware reaches the take-out station, it is raised or otherwise removed from the molds and is engaged by the arms of the transferring machine 6 about to be described in detail. The ware is then transferred to the conveyor 2 which may deliver it to an annealing leer or the like.

The transferring machine 6 is shown more particularly in Figs. 1 to 7 and preferably comprises a base 7 (Fig. 2) having a bracket 8 for securing the base to the fabricating machine or other suitable foundation, and an upwardly extending column 9 forming a housing for devices adapted to rotate the machine. Preferably, a sleeve 10 is telescoped over the upper end of the upright column 9 and a rotatable head or turret 11 is supported by the sleeve 10 through the intermediation of a ball bearing 12 (Figs. 4 and 7) or other friction reducing means. The turret preferably is rotated by a vertical shaft 13 extending upwardly from the base and column and is slidably keyed to the shaft to facilitate relative vertical movement between the shaft and turret without stopping rotation of the shaft or turret.

The turret may carry one or more outwardly extending transfer arms 14, for example two, as shown herein (Figs. 1 and 3) adapted to engage a container ejected from a mold 5 and transfer the container to the conveyor 2 by rotating the turret in a circumferential direction. Preferably, each of the arms has a vacuum operated container engaging cup 15 at the end thereof, shaped to fit the side wall of the container. The cups may have a series of apertures 16 (Fig. 3) therein in communication with a vacuum line which is effective at desired intervals to hold the container during its transfer. While the arms may have mechanically operated gripping devices at the ends thereof for engaging the ware, vacuum operated means are more desirable because they do not mar or otherwise deform the freshly molded ware.

In order to facilitate inverting the ware, as in the case of tumblers which have a wider mouth than base and are less inclined to be upset when placed in inverted position, each arm is attached to a shaft 17 (Figs. 3, 4, 6 and 7) mounted in a socket portion 18 having suitable bearings 19 and 20 adapted to facilitate rotation of the shaft about its longitudinal axis. If desired, apertures 21 and 22 are formed adjacent the socket portions for lubricating the bearings in the turret (Figs. 4 and 7). Preferably, each arm shaft is rotated by a gear 24 or the like connected thereto which meshes with or engages a circumferential extending gear rack 25 (Figs. 3 and 4) secured to a flange 26 (Figs. 4 and 7) at the upper end of the supporting sleeve 10. The gear rack may be located between the container engaging and releasing stations and may be of sufficient circumferential length to rotate the gear 24 on the shaft 180° whereby the arms invert the ware. Preferably, at a point diametrically opposite the gear rack 25 or at some point between the container releasing and engaging station, a similar gear rack 27 is secured to the flange 26 for rotating the gear 24 on the arm shaft another 180° to place the cups 15 in upright position to engage a succeeding container. In the event that longitudinal rotation of the shafts and transfer arms is not desired, or that the type of ware being transferred does not require inversion, the gear racks 25 and 27 may be removed from the flange 26. In this manner, the machine may be used for transferring ware from one position to another with or without inversion thereof.

Prior to engagement of the containers by the vacuum cups 15 on the arms 14, it is desirable that the cups be in substantial alignment with the containers, otherwise the vacuum supplied to the apertures 16 will not be effective to engage and support the containers and the cups, when moved, will merely push the containers away from the molds causing the containers to fall and break. Such breakage increases the cost of production and may necessitate stopping the machine to remove the broken glass.

In order to eliminate the above difficulties, the present invention contemplates holding the cups in accurate alignment with respect to the containers and locking the arms against accidental longitudinal rotation at the ware engaging station. This may be accomplished in a convenient manner, by attaching to the flange 26 a circumferential extending flange segment 30 (Figs. 3, 5 and 6) having a substantially flat or horizontal surface 31 adapted to be engaged by a slidable shoe member 32 or the like secured to the arm shaft 17. The shoe member, if desired, may be formed integral with the gear 24 or may be a separate member, but in either event is rotatable with the arm shaft. Preferably, the shoe member has substantially flat elongated surfaces 33 and 34 (Fig. 5) at opposite sides thereof, one of which, for example, the surface 33, rides on the surface 31 of the flange segment and serves to hold the arm shaft against rotation. The cooperating surfaces 31 and 33 by being substantially flat and smooth, may be easily lubricated and do not impede rotation of the turret but prevent longitudinal rotation of the arm shafts which might place the cups out of alignment with the containers. However, it will be understood that shoe and track members which have other shapes, may be utilized as long as they have cooperating surfaces for preventing rotation of the arms.

It is also desirable that the arms be locked against rotation at the container releasing station while the containers are deposited on the conveyor 2. This may be accomplished by securing to the flange 26 a similar flange segment 35 having a surface 36 adapted to cooperate with the surface 34 of the shoe member to lock the arms against longitudinal rotation. In this manner, the downwardly facing portions of the containers placed on the conveyor will be oriented in horizontal alignment with the conveyor to prevent the containers from toppling.

Figure 3:
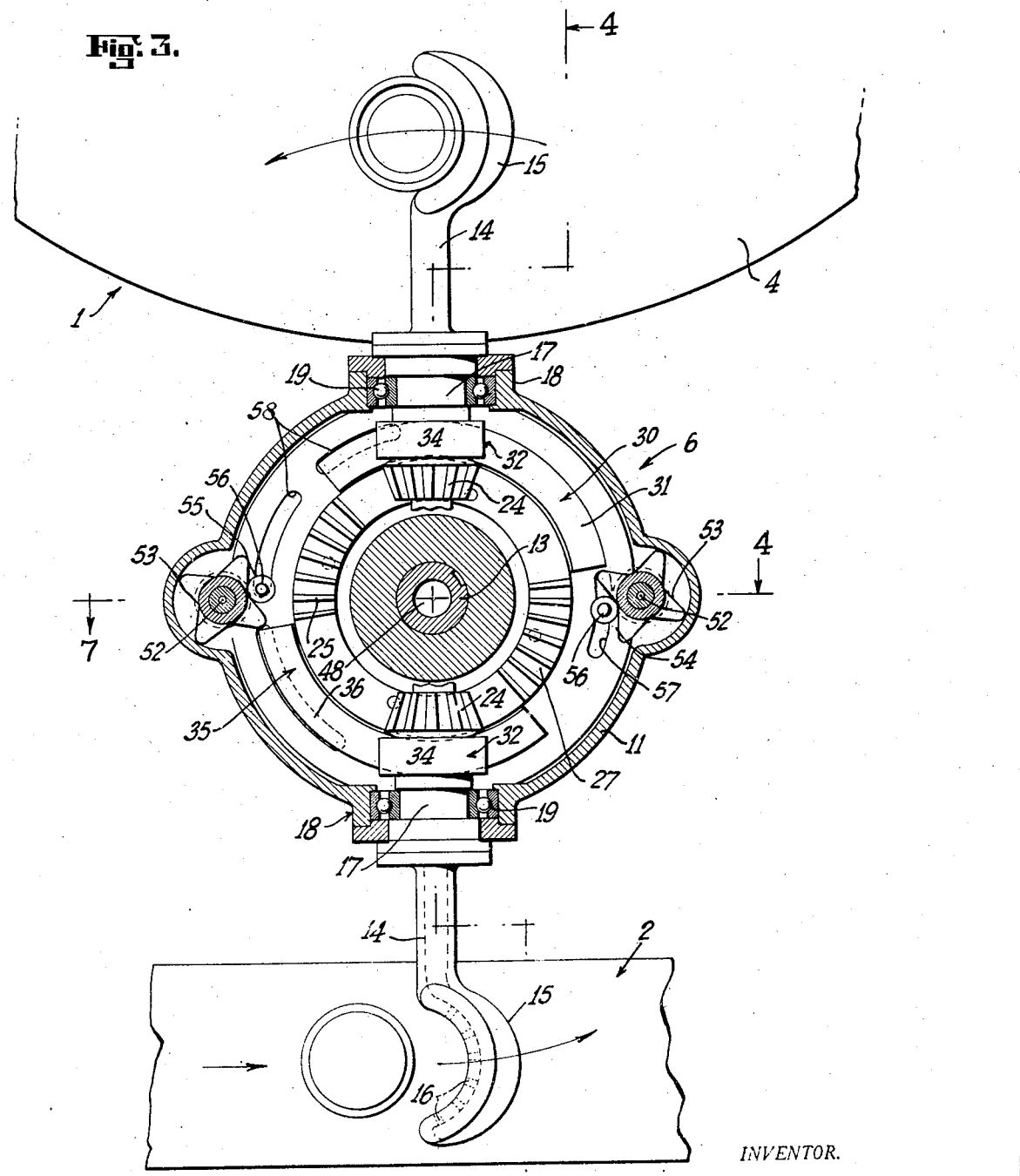
Fig. 3 is a top plan view illustrating devices for rotating the arms about their longitudinal axes and for rendering the vacuum means effective.
Figure 4:
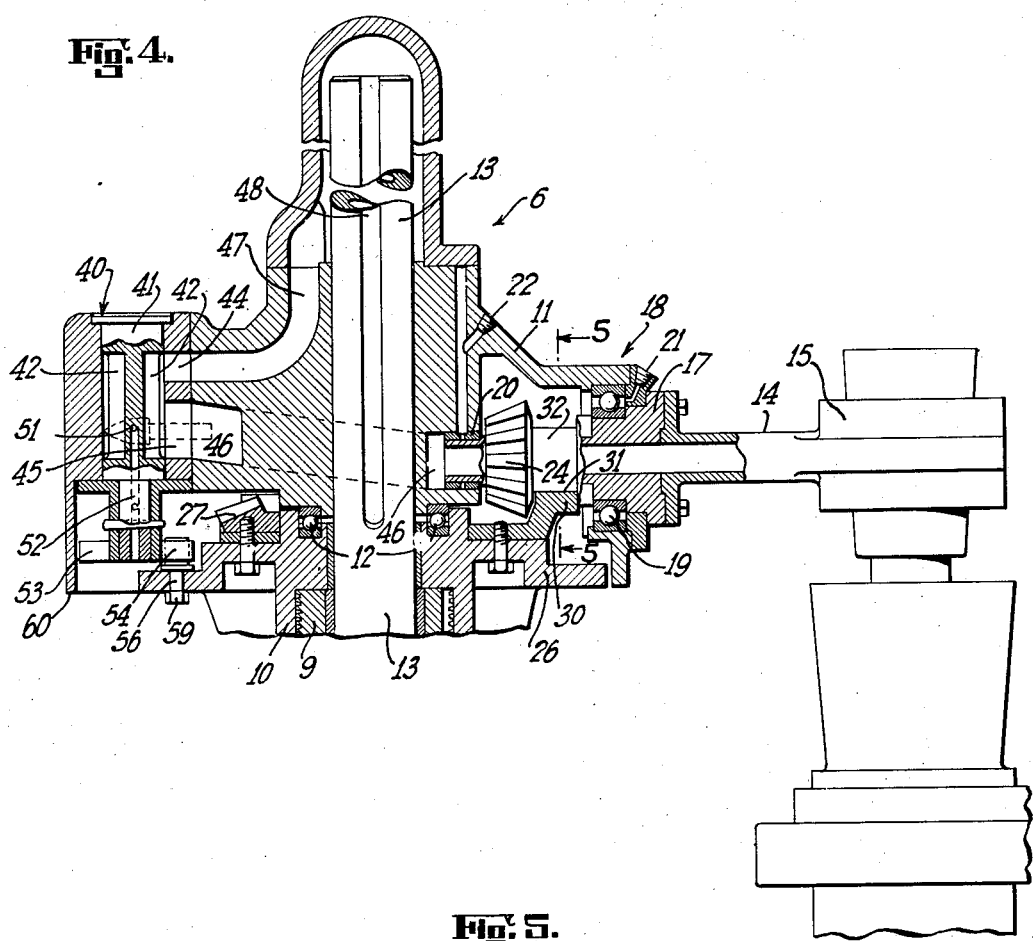
Fig. 4 is a staggered sectional view taken along the line 4—4 of Fig. 3.

As shown more particularly in Fig. 3, the flange segments 30 and 35 are diametrically opposite each other and the gear racks or segments 25 and 27 are adjacent and intermediate the flange segments. The trackway provided by these parts is adapted to operate one or more arms moved in a circular path by the turret to invert the ware during transfer, return the cups 15 to their upright position and hold the arms against rotation about their longitudinal axis during engagement or release of the containers. Adjacent the gear racks 25 and 27, the respective ends of the flange segments 30 and 35 are circumferentially spaced and sufficient clearance is provided to permit the shoe members 32 to be rotated by the arm shafts while the gears 24 are engaged by the gear racks 25 or 27. If longitudinal rotation to invert the ware is not desired, the gear segments 25 and 27 may be removed and replaced by suitable flange segments adapted to cooperate with the flange segments 30 and 35 to form an annular trackway for engaging the shoe members 32 throughout their travel in a circular path.

The vacuum cups 15 may be alternately subjected to a vacuum and the external atmosphere to correspondingly engage and release containers at desired intervals by suitable valves 40 (Figs. 4 and 7) each adapted to control one of the cups. Preferably, each valve comprises a core or piston 41 mounted in the turret for rotation having recesses 42 at diametrically opposite sides thereof adapted to register with a vacuum port 44 and a port 45 connected to the inner end of the arm shaft by a conduit 46 extending through the turret. Vacuum may be supplied to the port 44 by a conduit 47 in the turret, an aperture 48 in the vertical shaft 13 and a vacuum bearing cap 49 in the base of the machine connected to a vacuum supply line 50 (Figs. 1 and 2). The sides of the valve core intermediate the recesses 42 are spaced 90° therefrom and each have an aperture 51 leading to an exhaust conduit 52 in communication with the external atmosphere. By turning the valve core 90° out of the position shown in Figs. 4 and 6, one of the apertures 51 is adapted to register with the port 45 and relieve the vacuum in the cup 15 to cause the ware to be released (Fig. 7).

The valves illustrated herein are alternately effective to connect the cups to the vacuum line 50 and the external atmosphere by turning the cores 41 one-quarter of a revolution. This may be accomplished by connecting a star wheel 53 (Figs. 3, 4, 6 and 7) or other suitable rotatable member to the lower end of the valve core 41 and attaching to the flange 26 (Fig. 3) rollers or projecting members 54 and 55 adapted to engage a star wheel 53. In order to effect operation of the valves at desired intervals, the roller 54 is located adjacent the container engaging station and is adapted to turn the valve core in position to supply vacuum to the cup about to engage a container (Fig. 4). The roller 55 is located adjacent the container releasing station and is adapted to turn the valve core one-quarter of a revolution to close the vacuum port 44 and relieve the vacuum in the cup about to deposit a container on the conveyor by connecting the cup to the atmosphere through port 45, aperture 51 and conduit 52 (Fig. 7). The upper ends of the valve cores preferably are exposed to view and may have a legend or mark thereon to indicate whether they are open or closed. For example, a radial slot 43 (Figs. 1 and 7) may be formed therein which, when extending toward the center of the turret, indicates that the valve is open and when at 90° to that position that the valve is closed. This enables the operator of the machine to see whether or not the valves are working properly. Also, the slots permit the operator to insert a suitable tool therein and turn the valve cores manually.

If desired, circumferential position of the rollers 54 and 55 with respect to the stations may be changed to vary the point at which the valves are opened or closed. This may be done by mounting the rollers 54 on pins or stub shafts 56 extending through circumferential slots 57 and 58 (Figs. 3 and 6) in the flange 26 and securing the pins to the flange by nuts 59 threaded to the pins. By loosening the nuts 59, the pins carrying the rollers can be moved to a desired position and can be held at that position by tightening the nuts.

Preferably, the slot 57 is of sufficient length to permit adjustment of the pin 56 carrying the roller 54 for opening the valve. By adjusting the position of the pin the roller is effective to open the valve at various distances from the center line of the mold at the takeout station. This enables the vacuum cups to effectively grip containers of different styles and diameters upon coming in contact therewith. For example, if containers having a relatively large diameters are being transferred, the pin is placed in position to open the valve when the cup is a greater distance away from the center line of the mold than the cup would be if containers of smaller diameter were being removed.

The slot 58 preferably is of sufficient length to adjust the roller 55 to discharge the ware after it has been transferred approximately 135° to 180° from the take out station, depending, of course, upon the position of the conveyor 2 for receiving the ware.

It will be noted that the devices for rotating the arms about their longitudinal axis, the devices for holding them against accidental rotation and the devices for operating vacuum valves, are concealed within the turret or head casing (Figs. 1 and 2). Preferably, this is accomplished by mounting the valves and arm shafts in the turret and providing the turret with an annular depending flange 60 extending circumferentially about the various devices (Figs. 4, 6 and 7). In this manner, these devices are shielded against damage and cannot be operated accidentally by workmen coming in contact therewith. Also, the turret preferably has a smooth exterior and cannot catch the workmen's clothing or drag them into the machine to inflict injury.

The present invention contemplates raising and lowering the turret to adjust the height of the arms so that the cups can engage containers varying in height. To accomplish this, the sleeve 10 and column 9 are keyed together at 62 to prevent relative rotation between them but to permit the sleeve to slide vertically on the column and be raised or lowered by a hand wheel 64 threaded about the upper end of the column by mating threads 65 (Fig. 2). The hand wheel is rotatably connected to the sleeve by threaded means such as a bolt 66 which extends through the wheel and fits into an annular groove 67 at the lower end of the sleeve. Upon loosening the bolt, the hand wheel can be rotated clockwise or counter-clockwise to lower or raise the sleeve 10 and the turret 11. This adjustment can be made prior to or during operation of the machine without disturbing the drive connections because the turret is slidably keyed to the vertical drive shaft 13. After making the adjustment, the bolt 66 preferably is tightened to prevent accidental movement of the hand wheel.

In order to rotate the turret, a suitable drive (Figs. 1 and 2) is provided which may be connected to the drive (not shown) for rotating the mold table. Preferably, the drive comprises a connecting shaft 68 (Fig. 1) adapted to be rotated continuously, a universal shaft 69 geared to the shaft 68 at 70, a stub shaft 71 carrying a worm gear 72 meshing with a gear 73 on the turret shaft 13, and a clutch mechanism 74 (Figs. 1 and 8) adapted to operatively connect the shafts 69 and 71.

The clutch mechanism 74 is illustrated more particularly in Figs. 8 to 11 and is designed to prevent injury to the workmen in the event they are caught by one of the turret arms 14. To accomplish this, the clutch is adapted to disconnect the drive when rotation of the turret arms is materially resisted. Described in detail, the clutch comprises a casing 75 having a removal cover 76, a drive shaft 77 adapted to rotate a clutch face or engaging member 78, and a driven shaft 79 carrying a corresponding clutch face 80 adapted to be engaged and rotated by the clutch face 78. The clutch member 80 (Figs. 8 and 11) is provided with two or more spiral face portions 81 adapted to be engaged by similar spiral portions 81 of the clutch face 78 to connect the drive and driven shaft for rotation. Intermediate the spiral portions of the clutch face 78, a projection 82 and a recess 83 are formed adapted to mate with a corresponding recess and projection of the other clutch face 80 to guide the faces into operating relation.

The clutch faces do not interlock to transmit the torque of one shaft to the other, but due to the inclined spiral faces only transmit a component of the torque, the magnitude of the component depending upon the angle of the spiral portions and frictional resistance between the respective faces. Hence, if the resistance to rotation of the driven shaft suddenly increases or becomes greater than the torque the faces 78 and 80 are capable of transmitting, the spiral portions 81 serve to cam the clutch faces apart and disconnect the driven shaft 79 from the drive.

In order to facilitate relative movement of the clutch faces to render the clutch effective and ineffective in response to an excessive torque, the clutch face 78 preferably is connected to a sleeve 84 slidably keyed to the shaft 77. The sleeve 84 is adapted to be moved manually to place the clutch faces into operative position by a trunnion collar 85 (Fig. 9) having a ball bearing 86 therein for rotatably mounting the sleeve 84. The collar 85, in turn, is mounted on an annular member 87 hinged to the clutch casing at 88 and adapted to be oscillated by a lever 89 pivotally mounted on the clutch casing at 90.

Preferably, the lever is held in clutch operating position (Fig. 10) by suitable resilient means which may comprise a pin 91 having a head 92 seated in a recess 93 in the bottom of the clutch casing, a second pin or sleeve 94 telescoped over the pin 91 and having a head 95 seated in a recess 96 in the lever, and a helical spring 97 extending about the pins adapted to urge the pins out of telescoping relation.

As illustrated more particularly in Fig. 10, when the lever is in clutch operating position, the spring serves to maintain the lever in this position to hold the clutch faces frictionally in contact to facilitate normal operation of the machine. The amount of torque or resistance to rotation of the transfer arms which the clutch can withstand is in part dependent upon the strength of the spring, and can be varied by adjusting the tension of the spring. Should the clutch faces be cammed apart, the lever is oscillated and, when just past vertical position, is further oscillated by the spring 97 to the position shown in dotted lines in Fig. 10 or in elevation in Fig. 8. The spring in this manner, is effective to hold the clutch faces together, complete their separation, and to hold them apart until the lever is manually returned into clutch operating position.

In the operation of the machine, suitable cups 15 adapted to fit the ware being fabricated are attached to the arms 14 and the turret is raised or lowered by the hand wheel 64 so that the cups are in proper horizontal alignment with the sides of the ware. The operation of the valves is then predetermined by adjusting the valve core rotating rollers 54 and 55 in the circumferential slots 57. After the transferring machine is synchronized with the fabricating machine, the clutch 77 is placed in engaging position and the main drive is started.

Figure 5:
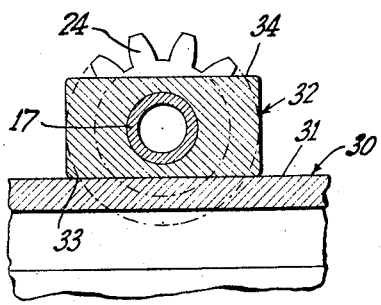
Fig. 5 is a sectional view taken along the line 5—5 of Fig. 4 illustrating a device for preventing longitudinal rotation of the arms while engaging or releasing the ware.

When a mold 5 stops at the takeout station, the container is removed therefrom by a plunger or the like and a cup 15 is rotated into engagement therewith while being held in accurate alignment by the shoe 32 and flange 30 (Fig. 5). Just prior to contacting the container, vacuum is supplied to the cup by turning the valve core into open position (Fig. 4) to hold the container against the cup. Upon rotation of the arm in a circular path from the mold table, the valve remains open (Fig. 6) while the gear rack 25 engages the gear 24 and rotates the arm to invert the container. As the arm approaches the delivery station, the shoe 32 and flange segment 35 again lock the arm shaft against longitudinal rotation while at the delivery station the valve core is turned 90° to shut off the vacuum, relieve the vacuum in the cup through the exhaust and deposit the container on the conveyor (Fig. 7). Upon further rotation of the turret, the arm is returned to the takeout station while the gear 24 meshes with the gear rack 27 and rotates the arm to place the cup into position for engaging a succeeding container.

The conveyor 2, partially shown, may be driven by any suitable source of power, which preferably is independently adjustable to vary the rate of speed at which the conveyor moves in the direction indicated by the arrow (Fig. 1). When the transfer cups 15 are rotated about their longitudinal axis to invert the ware, it is desirable for the conveyor to move at a lesser rate of speed than the rotating turret to enable the transfer cups to move away from the conveyor. If the containers are not inverted, they are in advance of the cups when released and it is then desirable to move the conveyor at a greater rate of speed than the turret to move the container out of the circular path of the cup.

If at any time during the operation of the machine the rotating arms strike a workman, the clutch members 79 and 80 automatically disengage and rotation of the turret ceases.

It will be seen that the present invention provides an improved transferring machine which is simple in construction and effective in operation to remove containers from a fabricating machine with a minimum amount of breakage. Due to the fact that the mold table and transferring machine can be readily synchronized, they can be operated safely at higher speeds. Also, by rotating the transferring arms continuously in a circular path, they are not subjected to excessive strains or sudden movement tending to release the ware during transfer. By providing several arms, the turret can be rotated at a lower rate of speed and yet transfer a large quantity of ware within a short time. In addition to these advantages, the machine does not endanger the workmen since the clutch prevents injury which may be caused by the rotating arms. Furthermore, the machine is rugged in construction and is fully capable of withstanding the rough usage to which it may be subjected.

While the above machine is particularly adapted for transferring glassware from a molding machine to a conveyor, it will be understood that similar machines can be used for transferring the ware at other stations during its manufacture. Also, the machine can be utilized for transferring other types of containers, such as jars, cans or other articles of manufacture.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a machine for automatically transferring glass articles from a forming machine to a conveyor, the combination of a vertical shaft, means operatively connected to the shaft to rotate the same and actuate the transferring machine, a stationary tubular supporting member extending upwardly about said shaft adapted to support a second tubular supporting member, said tubular member having a threaded exterior, a second tubular supporting member extending about said first tubular supporting member and adjustable with respect to said vertical shaft and first tubular member, and means extending about said first tubular member for adjustably supporting said second tubular member, said means being adapted to be rotated to raise and lower said second tubular member with respect to said vertical shaft and first tubular member and thus to regulate the effective height of the transferring machine.

2. In a machine for automatically transferring glass articles from a forming machine to a conveyor, the combination of a vertical shaft, means operatively connected to the shaft to rotate the same, a stationary tubular supporting member extending upwardly about said shaft, said tubular member having a threaded exterior, a second tubular supporting member extending about said first tubular supporting member, means extending about said first tubular member for supporting said second tubular member, said means being adapted to be rotated to raise and lower said second tubular member, a turret keyed to said vertical shaft and rotatably mounted on said second tubular member, a plurality of arms on said turret, and means on said arms for engaging and retaining glass articles.

3. In a machine for automatically transferring glass articles from a forming machine to a conveyor, the combination of a vertical shaft, means operatively connected to the shaft to rotate the same, a stationary tubular supporting member extending upwardly about said shaft, said tubular member having a threaded exterior, a second tubular supporting member extending about said first tubular supporting member, means extending about said first tubular member for supporting said second tubular member, said means being adapted to be rotated to raise and lower said second tubular member, a turret keyed to said vertical shaft and rotatably mounted on said second tubular member, a plurality of arms secured to said turret, suction means on said arms for engaging and retaining glass articles, and means operatively connected to said turret and through said turret to said suction means to subject said suction means to a vacuum.

4. In a device of the class described, the combination of a vertical shaft, supporting means extending about said vertical shaft, a turret rotatably mounted on said supporting means and extending about the upper end of said vertical shaft, a plurality of hollow arms rotatably mounted in said turret, suction means for engaging and retaining glass articles on the ends of said arms, a plurality of valves in said turret, conduits leading from said arms through said valves to a source of vacuum, means below said turret operatively secured to said supporting means having a plurality of slots therein, and means adjustably mounted within said slots adapted to engage and operate said valves as said turret is rotated for engaging and transferring vessels.

5. A device for transferring glass articles from a molding machine to a conveyor comprising, in combination, a vertical shaft, means operatively connected to the shaft for driving the same, a stationary tubular member extending upwardly about said shaft having means on its exterior surface adapted to facilitate vertical adjustment of a second tubular member and a turret, a second tubular member extending upwardly about said first tubular member having means cooperating therewith for vertical adjustment thereof, a turret rotatably mounted on said second tubular upright member and having a plurality of apertures therein, a plurality of bearings in said turret apertures, a plurality of transfer arms comprising hollow shafts rotatably mounted in said bearings and hollow members secured to said hollow shafts having suction means at the ends thereof adapted to engage and retain containers, gears on said hollow shafts, a gear rack operatively secured to the upper end of said second tubular upwardly extending member and adapted to engage said gears to rotate said transfer arms as said turret turns in transferring containers, means associated with said hollow shafts and second tubular upwardly extending members adapted to hold said transfer arms against rotation about their longitudinal axes while being moved by said turret into position, to engage or deliver containers, a plurality of valves carried by said turret, conduits leading from said transfer arms through said valves to a source of vacuum and means adjustably mounted with respect to said second tubular upwardly extending member adapted to engage said valves as said turret rotates to subject said suction means to a vacuum at predetermined positions of the turret and of the transfer arms thereon.

6. A device for transferring glass articles from a molding machine to a conveyor comprising, in combination, a vertical shaft, means operatively connected to the shaft for driving the same, a stationary tubular member extending upwardly about said shaft having means on its exterior surface adapted to facilitate vertical adjustment of a second tubular member and a turret, a second tubular member extending upwardly about said first tubular member having means cooperating therewith for vertical adjustment thereof, a turret rotatably mounted on said second upright tubular member and having an aperture therein, a bearing in said turret aperture, a transfer arm comprising a hollow shaft rotatably mounted in said bearing and a hollow member secured to said hollow shaft having suction means at the end thereof adapted to engage and retain a container, a gear on said hollow shaft, a gear rack operatively secured to the upper end of said second tubular upwardly extending member and adapted to engage said gear to rotate said transfer arm as said turret turns in transferring containers, means associated with said hollow shaft and second tubular upwardly extending member adapted to hold said transfer arm against rotation about its longitudinal axis while being moved by said turret into position to engage or deliver a container, a valve carried by said turret, a conduit leading from said transfer arm through said valve to a source of vacuum and means adjustably mounted with respect to said second tubular upwardly extending member adapted to engage said valve as said turret rotates to subject said suction means to a vacuum at predetermined positions of the turret and of the transfer arm thereon.

7. In a machine of the class described, the combination of a rotatable turret, an outwardly extending arm on said turret adapted to engage a container at one side thereof and transfer it from one position to another, a shaft for rotating said turret to move said arm in a continuous circular path, a vertically adjustable sleeve extending about said shaft adapted to support said turret adjacent the upper end thereof, a second sleeve intermediate said shaft and said vertically adjustable sleeve having means on the exterior thereof adapted to facilitate adjustment of said vertically adjustable sleeve, and means operatively connected to each of said sleeves for raising and lowering said vertically adjustable sleeve to adjust the height of said arm.

8. In a device of the class described, the combination of a hollow vertical shaft having a keyway therein, means operatively connected to said vertical shaft for rotating the same, a stationary tubular member forming a column about said shaft and retaining the shaft in upright position, a second tubular member extending about said first tubular member having an outwardly extending portion at the upper part thereof adapted to carry a valve operating projection, a valve operating projection carried by said outwardly extending portion, means operatively secured to said stationary tubular member and supporting said second tubular member for adjustably positioning said second tubular member with respect to said first tubular member, a turret rotatably mounted on said second tubular member and keyed to said vertical shaft and enclosing the upper end of said shaft, a plurality of tubular arms operatively connected to said turret, suction means on the ends of said tubular arms for engaging and retaining glass articles, a plurality of valves in said turret having means adjacent their lower ends for contacting said valve operating projections to operate said valves and subject said suction means to a vacuum at predetermined points in the movement of said arms, and conduits leading from said tubular arms through said valves to the upper end of said turret and to the upper end of said hollow shaft.

9. In a machine for automatically transferring glass articles from a forming machine to a conveyor, the combination of an upright hollow shaft, means operatively connected to the shaft to rotate the same, a stationary tubular supporting member extending upwardly about said shaft, said tubular member having a threaded exterior along a portion of its length, a second tubular supporting member extending upwardly about said first tubular supporting member, means extending about said stationary tubular member having a threaded surface thereon adapted to cooperate with the threads on the exterior portion of said stationary tubular member to support said second tubular member, said means being adapted to be rotated to raise and lower said second tubular member, a turret keyed to said vertical shaft and rotatably mounted on the upper end of said second tubular member, a plurality of rotatable arms on said turret, suction means on said arms for engaging and retaining glass articles, a plurality of spaced gear racks on the second tubular member for rotating said arms at intervals and means intermediate said spaced gear rack for preventing rotation of said arms.

10. In a machine for automatically transferring glass articles from a forming machine to a conveyor, the combination of an upright hollow shaft, means operatively connected to the shaft to rotate the same, a stationary tubular supporting member extending upwardly about said shaft, said tubular member having a threaded exterior along a portion of its length, a second tubular supporting member extending upwardly about said first tubular supporting member, means extending about said stationary tubular member having a threaded surface thereon adapted to cooperate with the threads on the exterior portion of said stationary tubular member to support said second tubular member, said means being adapted to be rotated to raise and lower said second tubular member, a turret keyed to said vertical shaft and rotatably mounted on the upper end of said second tubular member, a plurality of hollow arms secured to said turret and invertible about their own axes, suction means on said arms adjacent the outer ends thereof for engaging and retaining glass articles, and means operatively connected to said turret and through said turret to said hollow arms and through said hollow arms to said suction means adjacent the outer ends of the arms to subject said suction means to a vacuum.

11. In a device of the class described, the combination of a hollow vertical shaft having a keyway therein, means operatively connected to said vertical shaft for rotating the same, a stationary tubular member forming a column about said shaft and retaining the shaft in upright position, a second tubular member extending about said first tubular member with an outwardly projecting portion at the upper part thereof adapted to support a turret and having a plurality of substantially arcuate slots therein adapted to facilitate adjustable mounting of a plurality of valve operating projections, valve operating projections adjustably mounted in the substantially arcuate slots of said outwardly projecting portion, means operatively secured to said stationary tubular member and supporting said second tubular member for varying the effective height of said turret, a turret rotatably supported on said second tubular member and keyed to said vertical shaft and enclosing the upper end of said shaft, a plurality of tubular transferring arms invertibly mounted in said turret, suction means on the ends of said tubular transferring arms for engaging and retaining glass articles, a plurality of valves in said turret having means thereon adjacent their lower ends for contacting said valve operating projections to operate said valves and subject said suction means to a vacuum at predetermined points in the movement of said arms, and conduits leading from said tubular transferring arms through said valves to the upper end of said turret and to the upper end of said hollow shaft.

WILLIAM L. McNAMARA.